United States Patent [19]

Griffin

[11] 4,300,790

[45] Nov. 17, 1981

[54] SET OF MULTIPLE INTERLEAVED FORMS WITH SEPARABLE HEADING INPUT FLAP

[76] Inventor: Daniel J. Griffin, 100 N. LaSalle St., Chicago, Ill. 60602

[21] Appl. No.: 88,110

[22] Filed: Oct. 24, 1979

[51] Int. Cl.³ ........................ B41L 1/20; B42D 15/00; G06K 19/00

[52] U.S. Cl. ................................ 282/9 R; 282/23 R; 283/66 R; 235/487

[58] Field of Search .................. 282/1 R, 23 R, 23 A, 282/9 A, 9 R, 12–14; 283/66 R, 66 A, 57–61, 1 A, 1 B, 1 R, 29 A, 29 B, 66 R

[56] References Cited

U.S. PATENT DOCUMENTS 1,432,020 10/1922 Fales .................................... 283/58

1,738,633 12/1929 Brown .................................. 281/16

*Primary Examiner*—Paul A. Bell

*Assistant Examiner*—John S. Brown

[57] ABSTRACT

As a separable part of a multiple set of carbon interleaved forms for use with a computer terminal, the invention comprises a separable flap having a free lower edge and hingedly secured adjacent its upper edge to the upper end portion of the set with precisely located input area designations imprinted on its under surface for display in accurate relationship to the set forms when the free edge is lifted and swung upwardly through an arc of 180 degrees for insertion into the terminal, whereby following entry of the desired input area data on the flap, the latter may be separated from the set and discarded without wasting the hyperextended portions of a prior art set that have been required when the input area was disposed on the upper portion of the usual cover sheet.

5 Claims, 3 Drawing Figures

SET OF MULTIPLE INTERLEAVED FORMS WITH SEPARABLE HEADING INPUT FLAP

BACKGROUND OF THE INVENTION

1. Field of the Invention

This invention relates generally to multiple interleaved forms, and more particularly to those intended for use with a computer terminal.

2. Description of the Prior Art

Sets of multiple interleaved forms for use with a computer terminal are well-known, with the upper ends of the forms of a set secured together in the usual manner to maintain them in superposed alignment and permit them to be snapped apart after entry of the desired information or data on the input area at the top of the upper form and resulting automatic computer-controlled typing of that data at the proper locations on the forms and removal of the set from the terminal.

In order to provide such an input area at the top of the upper form of such a multiple form set, it has been the practice to extend or lengthen the upper portions of all of the other interleaved forms and carbons of the set for the length of the input area so that their data-receiving locations are properly aligned with those of the upper form. Such hyperextension of all of the carbon papers and interleaved forms under the upper form of a set in practice has been by a dimension ranging between approximately 2⅝ and 3½ inches, being the length of the input area, and in use those hyperextended portions of the forms are discarded as waste material. As illustrative of what this amounts to, it has been found that in a produced order of 400,000 multiple form finance loan sets of standard 8½ inch width, those discardable hyperextended portions comprised over seven tons of paper and carbon paper.

SUMMARY OF THE INVENTION

This invention eliminates the use of such hyperextended portions of the interleaved forms and carbon paper under the upper form of a set for use with a computer terminal, and thereby effects tremendous savings of the material involved, by employing a separable flap having a free lower edge and hingedly secured adjacent its upper edge to the upper end portion of the set with precisely located input area designations imprinted on its under surface for display in accurate relation to the set forms when the free edge is lifted and swung upwardly through an arc of 180 degrees for insertion into the terminal. Thus, following entry of the desired data on the input area of the flap to effect entry thereof into the computer, the flap may be separated from the set and discarded, even while the terminal is completing the forms under the control of the computer if desired.

Since the flap is only slightly longer than the upper input portion of the upper form of the prior hyperextended set, it uses almost the same amount of material as that prior input portion, so the elimination of the hyperextended portions of the prior set comprises savings of substantially one hundred percent thereof. When it is considered that approximately 50 million sets like those hereinbefore referred to are prepared and used annually, the savings of paper and carbon paper effected by the use of this invention with just those sets will be seen to be extremely substantial, and since it may be employed with any type of multiple interleaved form sets for use with computer terminals, it must be considered as a major factor for the good of the national economy.

DESCRIPTION OF THE PREFERRED EMBODIMENT

Figure 1:
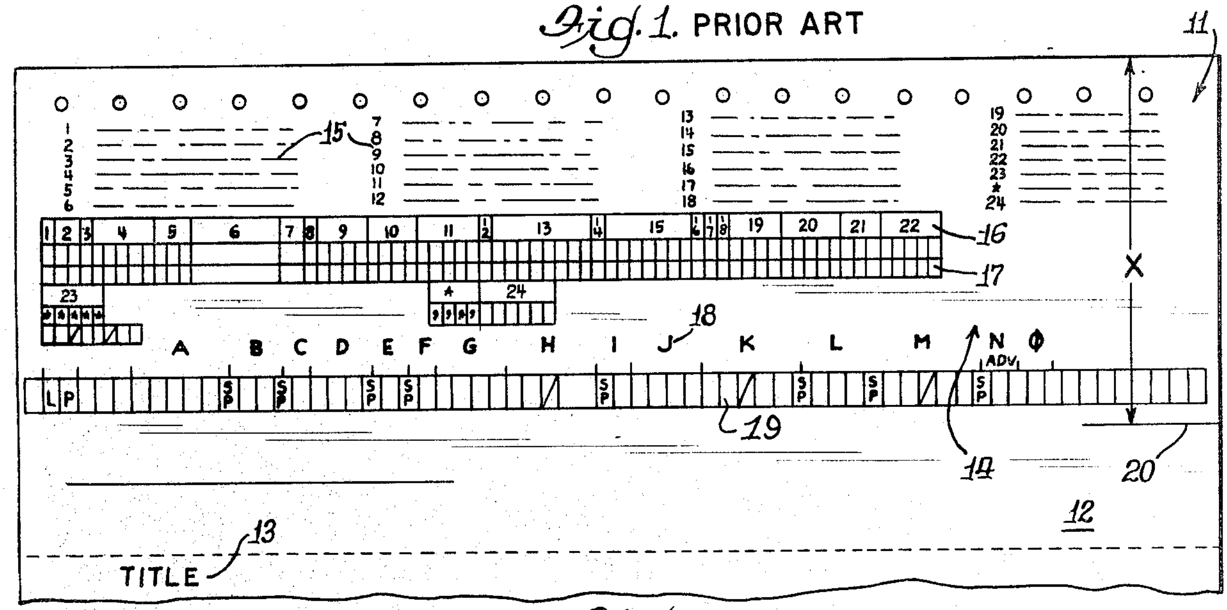
Fig. 1. PRIOR ART
FIG. 1 is a plan view of the top portion of a prior art set of multiple interleaved forms illustrating the input area on the upper form and showing the extent of the hyperextension of the lower forms resultingly required.

For comparative purposes and to assist in an understanding of the invention and its material advantages, the top portion of a prior art set of multiple interleaved forms for use with a computer terminal is illustrated in plan in FIG. 1 which is indicated generally by reference numeral 11 and comprises an upper form 12 with numbered horizontal lines and columns for pertinent data (not shown) to be entered by the terminal under control of the computer and a title portion 13. The same cover sheet on which the upper form 12 is inscribed has a top portion indicated generally by reference numeral 14 which comprises an input area made up of an index 15 of numbered designations for the convenience of an operator of the terminal in entering the pertinent data below similarly numbered heading boxes 16 and in ruled columnar spaces 17. This input area also includes a lower arrangement of lettered headings 18 for a line of data-receiving boxes 19. The headings include abbreviations of their subjects, and a suitable index thereof (not shown in FIG. 1) is listed at a convenient location elsewhere on the form 12.

It will be understood that in addition to the upper form 12, the set of forms 11 comprises a plurality of interleaved lower forms and sheets of carbon paper which are secured together at the top of the set in well-known manner to enable snapping out of the forms after entry of the desired data thereon has been completed. The provision of the input area 14 at the top of the sheet comprising the upper form 12 has required the hyperextension of all the other interleaved forms and carbon paper for a distance shown by the dimension "X" in FIG. 1 in order to properly align the data-receiving locations of the lower forms with those of upper form 12, and it is at the lower terminus of that dimension along a line 20 separating the form 12 and the input area 14 that the lower forms are perforated in well-known manner to facilitate their removal from the set.

It also will be understood that the set of forms 11 is manually fed into a computer terminal by an operator who enters the proper data in the columnar spaces 17 and the data-receiving boxes 19 of the input area 14, which data is thereby entered into the computer so that the top portion 14 of the set has no further use. The operator then fills in the title portion 13 of the forms and the computer actuates the terminal to enter the proper data in the data-receiving locations on the forms.

Figure 2:
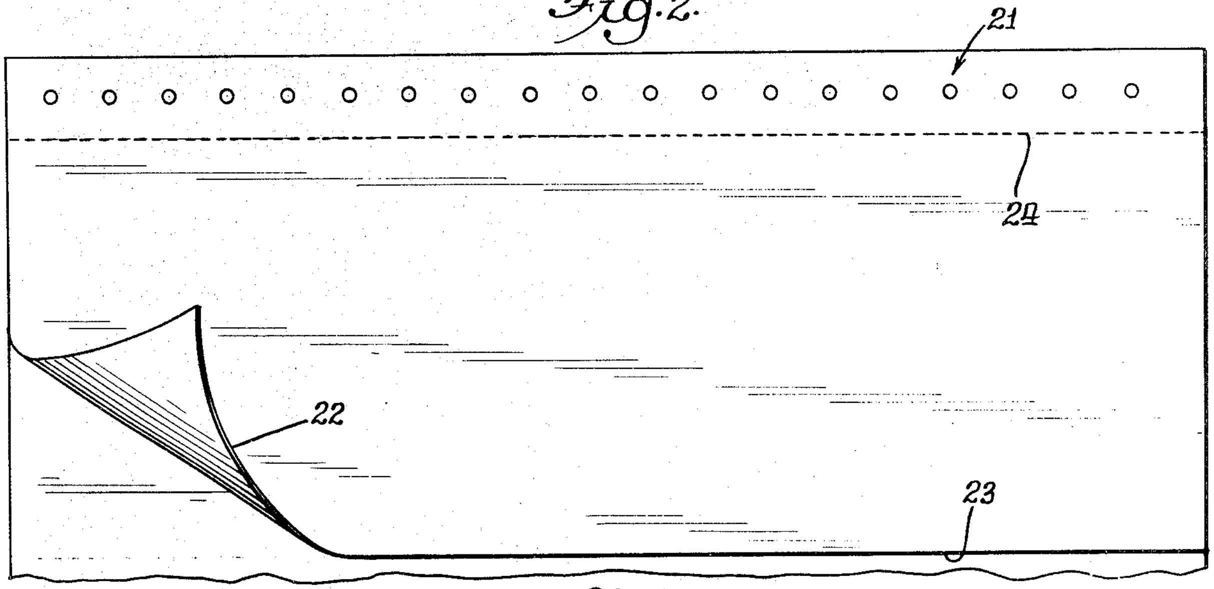
FIG. 2 is a plan view of the top portion of a set of multiple interleaved forms embodying a preferred embodiment of the invention showing the input flap in its lower inoperative position.
Figure 3:
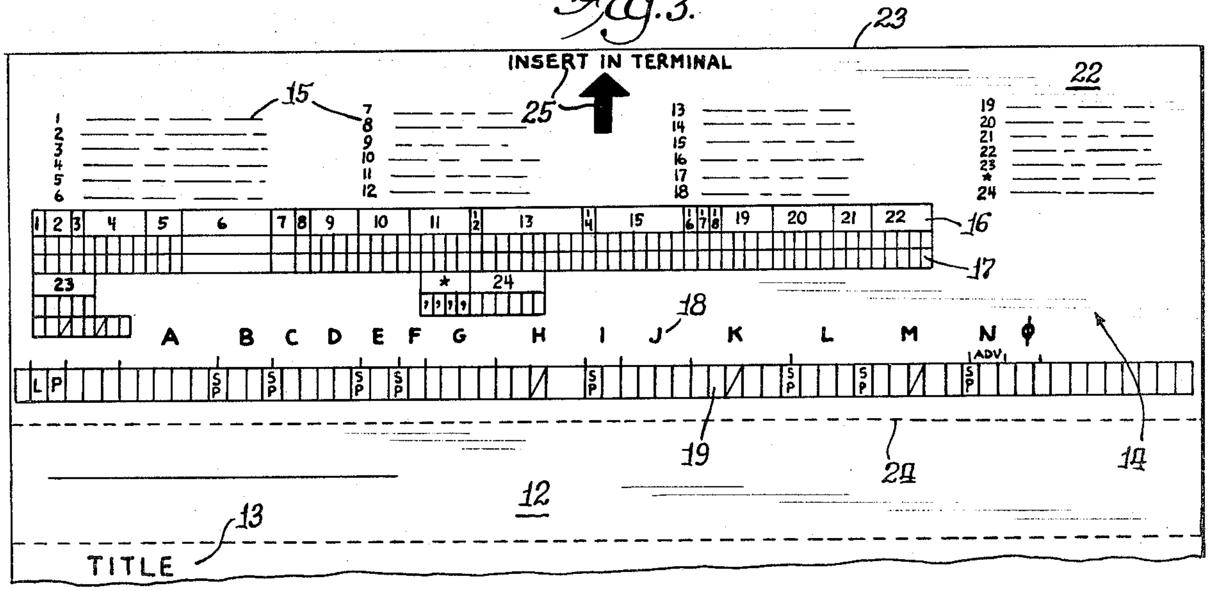
FIG. 3 is a view similar to FIG. 2 showing the input flap in its raised operative position to expose the input area on its normally under surface.

As previously noted herein, the present invention eliminates the wasted hyperextended top portions of the lower interleaved forms and carbon paper of the prior set 11, and this has been accomplished in the manner shown in FIGS. 2 and 3, wherein reference numeral 21 indicates generally a set of multiple interleaved forms for use with a computer terminal comprising an upper form 12 and lower interleaved forms and carbon paper similar to those of the set 11, without the input top portion 14 on the cover sheet and the other hyperextended portions, the several forms and carbon paper sheets being secured together at the top of the set in well-known manner (FIG. 2). The set 21 also comprises a cover or heading input flap 22 of any suitable material, such as that of the upper form 12 or a desired plastic, secured adjacent its top edge to and with the other components of the set 21 and having a free lower edge 23 and a hinge portion, preferably formed by a transverse line of spaced perforations 24 across the flap adjacent its upper edge. The hinge means for the flap 22 may be a score line or its attachment to the set may be in such manner as to facilitate its being lifted and folded along the line 24, and rather than employing perforations along that line for subsequent separation of the flap, its upper edge portion may be secured to the set by "spot pasting" to join it sufficiently lightly to enable it to be snapped out of the set.

When the set 21 is to be put to use, the free edge 23 of the flap 22 first is lifted and swung upwardly through an arc of 180 degrees about the hinge portion 24 from its lower inoperative position of FIG. 2 to its operative raised or inverted position of FIG. 3. As will be seen in the latter, the normally under and now exposed surface of the flap 23 is provided with the same input area 14 as previously described, including index 15 of numbered designations, numbered heading boxes 16, columnar spaces 17, lettered headings 18 and data-receiving boxes 19, precisely located with relation to the data-receiving portions of the upper form 12. The free edge portion of the normally under surface of the heading input flap 22 also preferably is provided with directional indicia 25 to remind the operator how the set 21 is to be inserted into the terminal. This set 21 with its novel heading input flap 22 is used in similar fashion as the prior set 11 after raising the flap 22 to its operative position of FIG. 3, as explained, by inserting the set as indicated into a computer terminal, entering the desired data in the input area 14, filling in the title portion 13 of the forms and initiating operation of the computer to cause actuation thereby of the terminal to enter the proper data in the data-receiving locations on the forms. It will be understood, of course, that when the flap 22 is swung upwardly as described to its operative position of FIG. 3, no part of its input area is superposed over the forms of the set, so that entry of data therein is effective only to enter the same in the computer. At any time after entry of the data in the input area 14, the flap 22 may be separated from the set 21 and discarded, as by tearing along the hinge portion 24 or snapping the flap out of the set. The principal advantage of this invention, however, is the tremendous saving effected by its elimination of the hyperextensions of all of the forms in the set below the upper form 12 and of the interleaved carbon paper required in the prior set 11 for the distance shown by the dimension "X" in FIG. 1.

It is thought that the invention and its attendant advantages will be understood from the foregoing description, and it will be apparent that various changes may be made in the form, construction and arrangement of the parts without departing from the spirit of the invention or sacrificing all of its material advantages, the form hereinbefore described and shown in the drawings being merely a preferred embodiment thereof.

The embodiments of the invention in which an exclusive property or privilege is claimed are defined as follows:

1. In a set of multiple interleaved forms, secured together at their top ends and having columnarly arranged data-receiving locations in horizontal lines numerically identified for use in a computer terminal, the improvement comprising a heading input flap having an upper edge portion secured to said forms, a free lower edge, transversely extending hinge means adjacent said upper edge portion, and input area designations on the under surface thereof, whereby lifting of said free edge and swinging the same upwardly about said hinge means will display said input area designations in precisely accurate relation to said data-receiving locations on said forms.

2. A heading input flap according to claim 1 having directional indicia means on the under surface adjacent said free edge to assist in proper insertion of said set into said computer terminal.

3. A heading input flap according to claim 1, wherein said hinge means comprises a row of perforations to enable tearing of said flap from said set after the desired data has been entered thereon by operation of the computer terminal.

4. A separable heading input flap for a set of multiple forms with data-receiving areas thereon and interleaved with carbon papers and secured together at their upper ends for use with a computer terminal, comprising a sheet secured at an upper edge portion thereof to said set and having a free lower edge and input area designations on its under surface, and separable hinge means extending across said sheet adjacent said upper edge portion, whereby lifting of said free edge will display said input area designations in accurate relation to said data-receiving areas on said forms.

5. A separable heading input flap according to claim 1, wherein said hinge means comprises a row of perforations to enable tearing of said flap from said set after the desired data has been entered thereon by operation of the computer terminal.

* * * * *